(12) United States Patent
Conti et al.

(10) Patent No.: US 10,006,329 B2
(45) Date of Patent: Jun. 26, 2018

(54) EXHAUST AFTER-TREATMENT DEVICE CONVERSION EFFICIENCY OPTIMIZATION

(71) Applicant: GM GLOBAL TECHNOLOGY OPERATIONS LLC, Detroit, MI (US)

(72) Inventors: Antonino Conti, Turin (IT); Andrea De Filippo, Piemonte (IT)

(73) Assignee: GM Global Technology Operations LLC, Detroit, MI (US)

(*) Notice: Subject to any disclaimer, the term of this patent is extended or adjusted under 35 U.S.C. 154(b) by 35 days.

(21) Appl. No.: 15/346,203

(22) Filed: Nov. 8, 2016

(65) Prior Publication Data

US 2018/0128139 A1  May 10, 2018

(51) Int. Cl.

| | |
|---|---|
| *F01N 3/02* | (2006.01) |
| *F01N 3/08* | (2006.01) |
| *F01N 5/02* | (2006.01) |
| *F01N 9/00* | (2006.01) |
| *F01P 3/20* | (2006.01) |
| *F01N 13/00* | (2010.01) |
| *B01D 53/04* | (2006.01) |
| *B01D 53/30* | (2006.01) |

(52) U.S. Cl.
CPC ............ *F01N 3/0842* (2013.01); *B01D 53/04* (2013.01); *B01D 53/30* (2013.01); *F01N 3/0205* (2013.01); *F01N 5/02* (2013.01); *F01N 9/00* (2013.01); *F01N 13/008* (2013.01); *F01P 3/20* (2013.01); *B01D 2257/404* (2013.01); *F01N 2410/00* (2013.01); *F01N 2410/02* (2013.01); *F01N 2410/03* (2013.01); *F01N 2560/06* (2013.01); *F01N 2570/14* (2013.01); *F01P 2060/00* (2013.01)

(58) Field of Classification Search
CPC ........ F01N 3/0205; F01N 3/0842; F01N 3/20; F01N 5/02; F01N 13/087; F01N 2410/00; F01N 2410/02; F01N 2410/03; F01N 2560/06

See application file for complete search history.

(56) References Cited

U.S. PATENT DOCUMENTS

| | | | | |
|---|---|---|---|---|
| 5,184,462 | A | * | 2/1993 | Schatz ............... B01D 53/9481 60/274 |
| 6,009,703 | A | * | 1/2000 | Bouchez .................. F01N 3/02 60/274 |

(Continued)

*Primary Examiner* — Audrey K Bradley
(74) *Attorney, Agent, or Firm* — Quinn IP Law

(57) ABSTRACT

An after-treatment (AT) system for an exhaust gas flow from an internal combustion engine includes an AT device and an exhaust passage carrying the exhaust gas flow from the engine to the AT device. The system also includes a heat exchanger in fluid communication with the exhaust passage upstream of the AT device and configured to remove heat energy from the exhaust gas flow. The system additionally includes an exhaust gas flow bypass in fluid communication with the exhaust passage and configured to route the exhaust gas flow from the exhaust passage to the AT device around, i.e., in bypass of, the heat exchanger. Furthermore, the system includes a bypass valve configured to selectively direct the exhaust gas flow to one of the heat exchanger and the exhaust gas flow bypass. A vehicle employing the AT system and a method of operating such an AT system are also disclosed.

16 Claims, 3 Drawing Sheets

(56) References Cited

U.S. PATENT DOCUMENTS

| | | | | |
|---|---|---|---|---|
| 6,347,511 B1* | 2/2002 | Haines | ............... | B01D 53/9431 |
| | | | | 422/169 |
| 8,997,464 B2* | 4/2015 | Santoso | ................ | F01N 3/0835 |
| | | | | 60/288 |
| 2003/0005686 A1* | 1/2003 | Hartick | .............. | B01D 53/9431 |
| | | | | 60/298 |
| 2012/0036850 A1* | 2/2012 | Ernst | ..................... | F01K 23/065 |
| | | | | 60/615 |
| 2013/0313031 A1* | 11/2013 | Porras | ....................... | F01N 5/02 |
| | | | | 180/65.21 |

* cited by examiner

US 10,006,329 B2

EXHAUST AFTER-TREATMENT DEVICE CONVERSION EFFICIENCY OPTIMIZATION

INTRODUCTION

The present disclosure is drawn to a system and method for enhancement and optimization of conversion efficiency of an exhaust gas after-treatment (AT) device used to limit exhaust emissions of an internal combustion engine.

Various exhaust after-treatment (AT) devices, such as particulate filters and other devices, have been developed to effectively limit exhaust emissions from internal combustion engines. Modern compression-ignition or diesel internal combustion engines employ specific AT devices, such as a diesel oxidation catalyst (DOC), a lean $NO_X$ trap (LNT), a diesel particulate filter (DPF), and a selective catalytic reduction (SCR) catalyst.

Such AT devices typically employ specialized substrate structures with active precious metals selected to remove specific emissions from the exhaust gas flow. AT device conversion efficiency, or the effectiveness in removal of subject emissions by such AT devices, is typically dependent on the operating temperature of the respective substrate structures, and generally occurs over a particular temperature range of the exhaust gas flow.

SUMMARY

An after-treatment (AT) system for an exhaust gas flow from an internal combustion engine includes an AT device and an exhaust passage configured to carry the exhaust gas flow from the engine to the AT device. The AT system also includes a heat exchanger arranged in fluid communication with the exhaust passage upstream of the AT device and configured to remove heat energy from the exhaust gas flow. The AT system additionally includes an exhaust gas flow bypass in fluid communication with the exhaust passage and configured to route the exhaust gas flow from the exhaust passage to the AT device around, i.e., in bypass of, the heat exchanger. Furthermore, the AT system includes a bypass valve configured to selectively direct the exhaust gas flow to one of the heat exchanger and the exhaust gas flow bypass to thereby enhance and optimize conversion efficiency of the AT device in limiting exhaust emissions of the engine.

The AT system may also include a first temperature sensor configured to detect a temperature of the exhaust gas flow in the exhaust passage upstream of the heat exchanger. The first sensor may generate a first sensor signal indicative of the detected temperature. Additionally, the AT system may include a second temperature sensor configured to detect a temperature of the exhaust gas flow in the exhaust passage downstream of the heat exchanger and upstream of the AT device. The second sensor may generate a second sensor signal indicative of the detected temperature. Additionally, the AT system may include an electronic controller configured to regulate the bypass valve in response to the first and second sensor signals generated by the respective first and second temperature sensors.

The electronic controller may be configured to regulate the bypass valve to direct the exhaust gas flow to the heat exchanger when the detected temperature indicated by the first sensor signal is outside of a predetermined temperature range, and direct the exhaust gas flow to the exhaust gas flow bypass when the detected temperature indicated by the second sensor signal is within the predetermined temperature range.

The internal combustion engine may be a compression-ignition engine and the AT device may be a lean nitrogen oxide (NOX) trap (LNT).

The engine may include a turbocharger and the heat exchanger may be arranged downstream of the turbocharger.

The heat exchanger may be an exhaust gas to liquid heat exchanger and the liquid used by the heat exchanger may be a coolant of the internal combustion engine.

The internal combustion engine may include a cooling circuit and the heat exchanger may be in fluid communication with the cooling circuit.

A vehicle employing the above-described AT system and a method of operating such an AT system are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
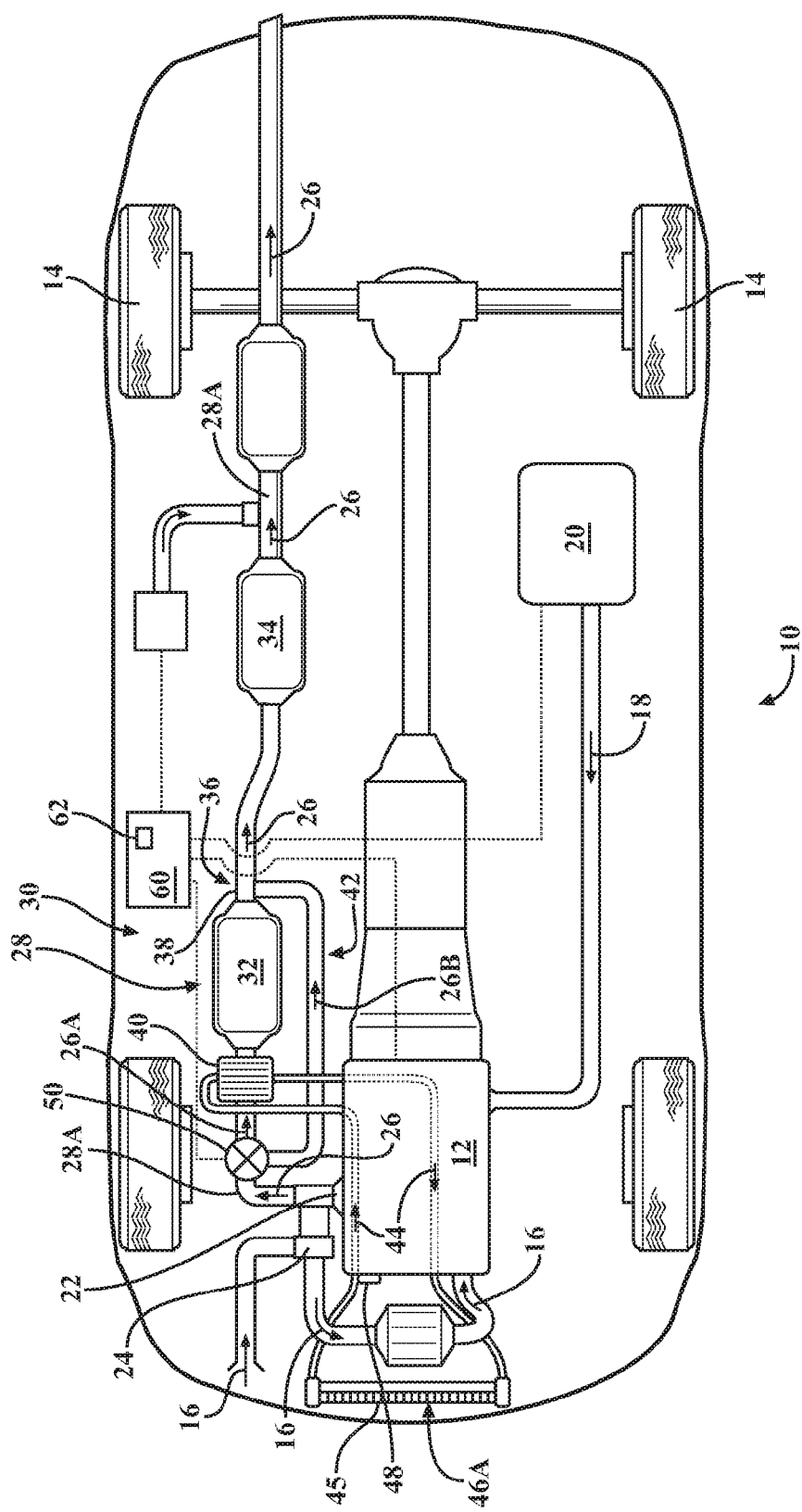
FIG. 1 is a schematic plan view of a vehicle having an internal combustion engine connected to an exhaust after-treatment (AT) system having an AT device, a heat exchanger, an exhaust bypass, and a bypass valve, according to the disclosure.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by a flow of exhaust gas, specifically the exhaust gas flow 26 released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
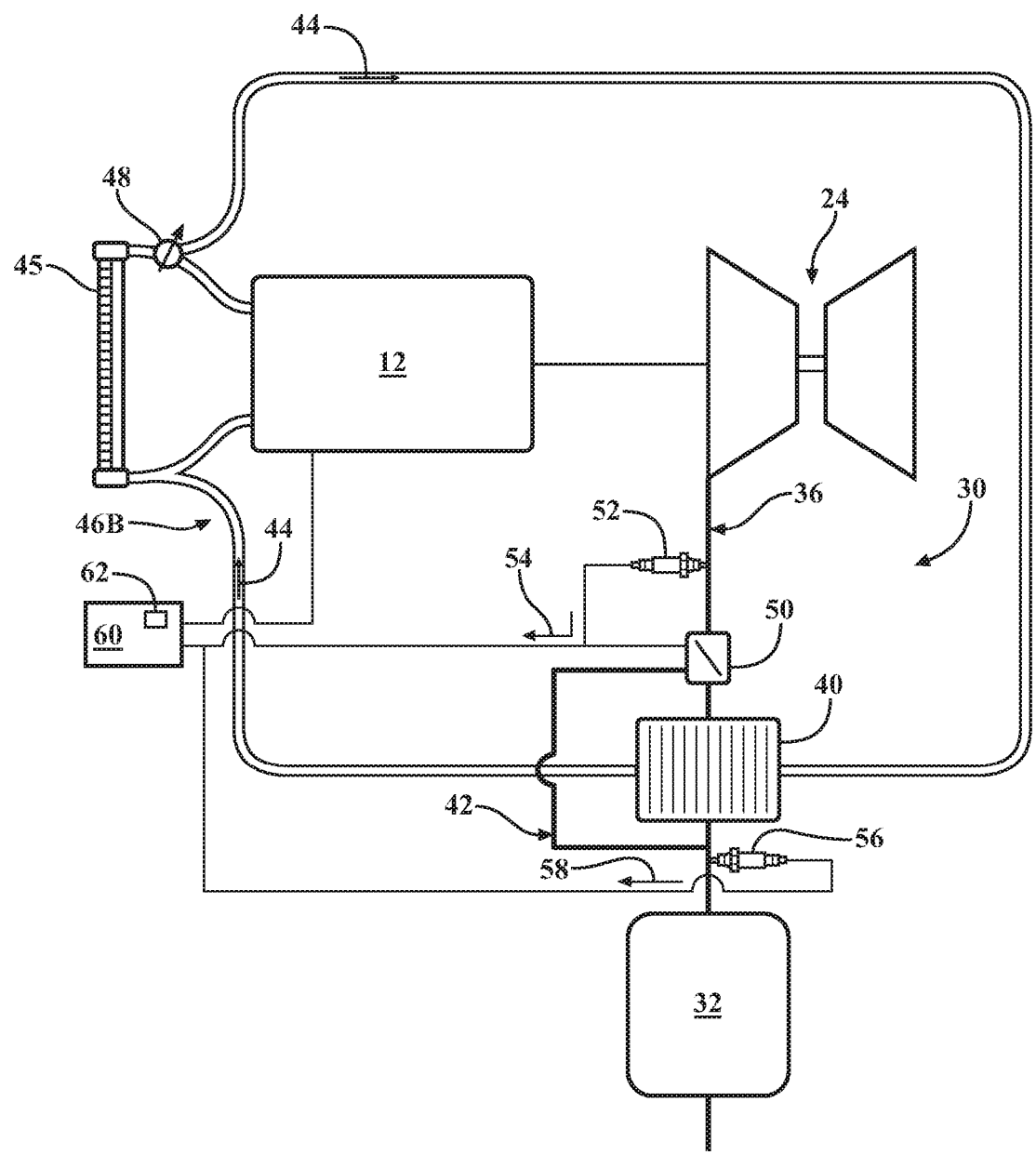
FIG. 2 is a schematic diagram of operative connections of the internal combustion engine and the AT system shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas flow 26. As shown in FIGS. 1 and 2, the AT system 30 operates as part of the exhaust system 28. The AT system 30 includes a first AT device 32 which may be close-coupled to the turbocharger 24 and a second AT device 34 positioned in the exhaust gas flow downstream and which may be close-coupled to the first AT device. As employed herein, the term "close-coupled" with respect to the arrangement of the first and second AT devices 32, 34 denotes each of the subject devices being in close proximity to each other and arranged inside an engine compartment 11 of the vehicle 10 for close proximity to the engine 12.

The close-coupled arrangement of the first and second AT devices 32, 34 reduces length of the exhaust passage 28A for carrying the exhaust gas flow 26 from the first AT device 32 to the second AT device 34. Consequently, such close-coupling of the first and second AT devices 32, 34 to the engine 12 provides a compact packaging arrangement that minimizes time for activation of the AT system 30 in after-treatment of the exhaust gas flow 26 following a cold-start of the engine 12. As shown, the first AT device 32 may be a diesel oxidation catalyst (DOC) or a lean nitrogen oxide ($NO_X$) trap (LNT), while the second AT device 34 may be a dual-function substrate including a selective catalytic reduction (SCR) catalyst and a diesel particulate filter (DPF).

The primary function of the DOC is reduction of carbon monoxides (CO) and non-methane hydrocarbons (NMHC). When present, the DOC is additionally configured to generate nitrogen dioxide ($NO_2$), which may be used by the SCRF arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas flow 26 prior to the gas reaching the DOC.

The primary function of the LNT is to reduce oxides of nitrogen or $NO_X$ that are emitted by the engine 12 in the exhaust gas flow 26 as a byproduct of the reaction of nitrogen and oxygen gases in the air following a combustion event. The LNT removes $NO_X$ molecules from the exhaust gas flow 26 by adsorption, i.e., trapping and storing them internally during operation of the engine 12, thus acting like a molecular sponge. Typically, the LNT includes a ceramic honeycomb substrate structure with a catalyzed wash-coat, i.e., mixed with an active precious metal, that is applied to channels of the substrate.

The primary function of the SCR is to convert nitrogen oxides ($NO_X$) into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas flow 26. The primary function of the DPF is to collect and dispose of particulate matter emitted by the engine 12. The DPF acts as a trap for removing the particulate matter, specifically, soot, from the exhaust flow. Similar to the DOC described above, the DPF typically contains precious metals, such as platinum and/or palladium, which functions as a catalyst to accomplish the noted objective.

As shown, the DOC or the LNT first AT device 32 is positioned upstream of the second AT device 34 including the SCR and DPF. The AT system 30 also includes an exhaust passage 36 configured to carry the flow of exhaust gas 26 from the first AT device 32 to the second AT device 34. The exhaust passage 36 may be part of a transfer pipe 38 fluidly connecting the first and second AT devices 32, 34. As shown, a heat exchanger 40 is arranged in fluid communication with the exhaust passage 36 downstream of the turbocharger 24 and upstream of the first AT device 32. The heat exchanger 40 is configured to receive the flow of the exhaust gas 26 upstream of the first AT device 32 and remove heat energy from the exhaust gas flow. An exhaust gas flow bypass 42 is arranged in fluid communication with the exhaust passage 36 and configured to route the exhaust gas flow 26 from the exhaust passage to the first AT device 32 around, i.e., in bypass of, the heat exchanger 40. Although the ensuing description is primarily directed to controlling temperature of the exhaust gas flow 26 through the first AT device 32, nothing precludes the temperature of the exhaust gas flow 26 from being similarly controlled through other AT devices, such the second AT device 34 discussed above.

The heat exchanger 40 may be configured as an exhaust gas to liquid heat exchanger. The liquid used by the heat exchanger 40 may be a coolant 44 of the internal combustion engine 12. As shown, in such an embodiment the engine 12 includes a cooling circuit employing a radiator 45 and the heat exchanger 40 is in fluid communication with the cooling circuit. The cooling circuit from which the heat exchanger receives the coolant 44 may be a primary cooling circuit 46A (shown in FIG. 1) or an auxiliary cooling circuit 46B (shown in FIG. 2) of the engine 12. In either the primary cooling circuit 46A or the auxiliary cooling circuit 46B, the coolant 44 may be circulated via a fluid pump 48. The fluid pump 48 may be driven either mechanically, such as directly by the engine 12, or by an electric motor (not shown).

The AT system 30 also includes a bypass valve 50 configured to selectively direct the exhaust gas flow 26 to the heat exchanger 40 or to the bypass 42. In such a case, the bypass valve 50 may be a simple diverter valve that directs the entirety of the exhaust gas flow 26 either to the heat exchanger 40 or through the bypass 42. The bypass valve 50 may also be operable to selectively apportion or divide the exhaust gas flow 26 and direct one portion, such as a portion 26A of the exhaust gas flow to the heat exchanger 40 and direct the remaining portion of the exhaust gas flow to the bypass 42. In such a case, the bypass valve 50 may be a proportioning valve that permits separate, variably controlled portions of the exhaust gas flow to be directed to the heat exchanger 40 and to the bypass 42. Such selectively directed or apportioned flow of the exhaust gas 26 is intended to enhance and optimize conversion efficiency of the first AT device 32 in limiting exhaust emissions of the engine 12.

The AT system 30 may also include a first temperature sensor 52 configured to detect a temperature of the exhaust gas flow 26 in the exhaust passage 36 upstream of the heat exchanger 40. The first temperature sensor 52 is also configured to generate a first sensor signal 54 indicative of the detected temperature. The AT system 30 may additionally include a second temperature sensor 56 configured to detect a temperature of the exhaust gas flow 26 in the exhaust passage 36 downstream of the heat exchanger 40 and upstream of the first AT device 32. The second temperature sensor 56 is also configured to generate a second sensor signal 58 indicative of the detected temperature. As shown in FIG. 1, the AT system 30 may further include an electronic controller 60. The controller 60 is configured to regulate the bypass valve 50 in response to the first and second signals 54, 58 generated by the respective first and second temperature sensors 52, 56.

The controller 60 may be a stand-alone unit, or be part of an electronic control unit (ECU) that regulates the operation of engine 12. As shown, the controller 60 is arranged on the vehicle 10 and includes a processor and a readily accessible non-transitory memory. Instructions for controlling operation of the AT system 30 may be programmed or recorded in the memory of the controller 60 and the processor may be configured to execute the instructions from the memory during operation of the vehicle 10. The controller 60 may also be programmed to regulate the bypass valve 50 to direct the exhaust gas flow to the heat exchanger 40 when the detected temperature indicated or represented by the first sensor signal 54 is outside of a predetermined temperature range 62.

The predetermined temperature range 62 is intended to be indicative of the temperatures of the exhaust gas flow 26 which afford the most effective removal of exhaust emissions by the substrate structures of particular AT device 32 or 34. The predetermined temperature range 62 may, for example, be approximately 150-350 degrees Celsius. Additionally, the controller 60 may be programmed to regulate the bypass valve 50 to direct the exhaust gas flow 26 to the exhaust gas flow bypass 42 when the detected temperature indicated by the second sensor signal 58 is within the predetermined temperature range 62.

Figure 3:
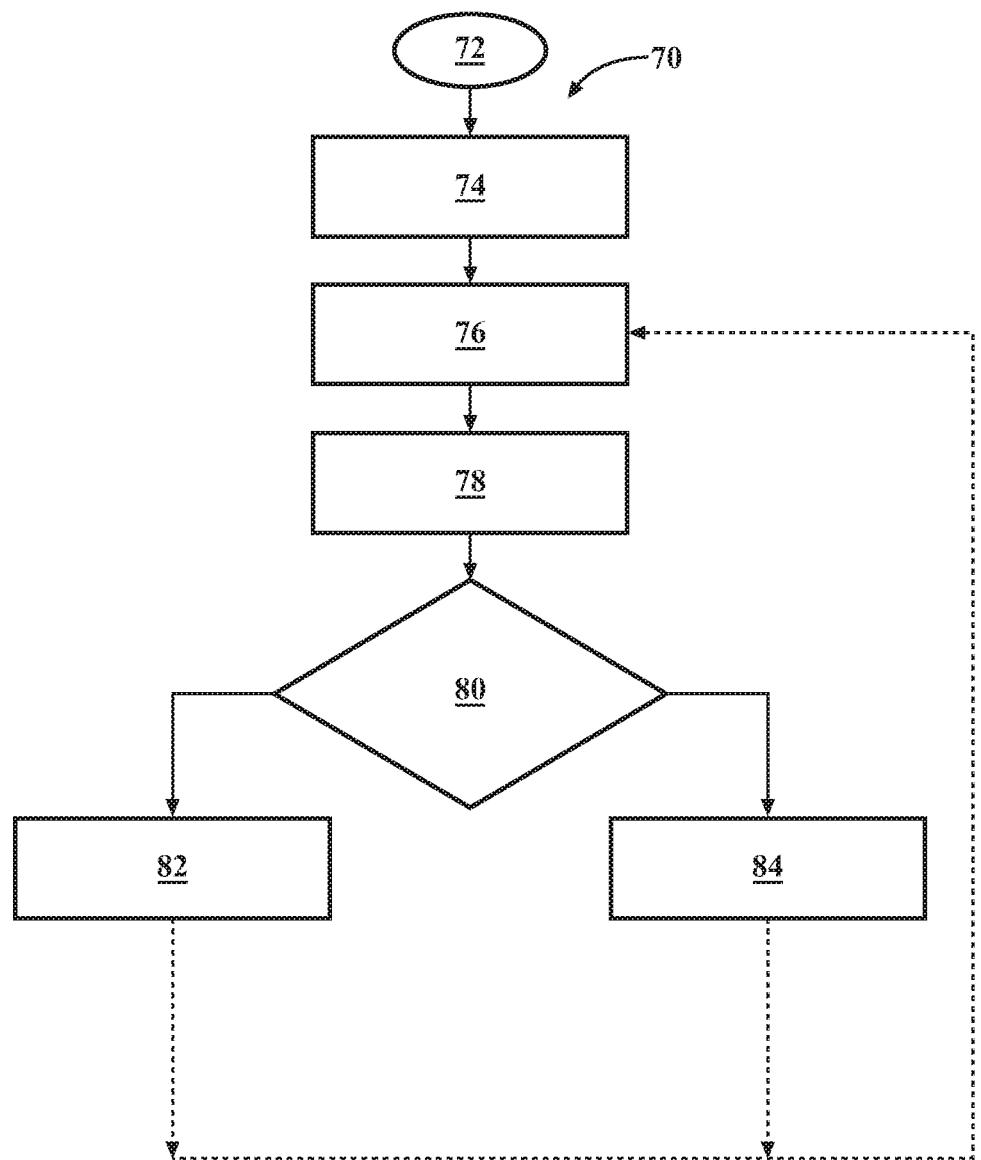
FIG. 3 is a flow diagram of a method of operating the AT system shown in FIGS. 1 and 2.

FIG. 3 depicts a method 70 of operating the after-treatment (AT) system 30 having the after-treatment (AT) device, for example the first AT device 32, as described above with respect to FIGS. 1 and 2. Although the method 70 is described herein with reference to the first AT device, the same method may be applied to other AT devices, such the second AT device 34 discussed above. The method 70 initiates in frame 72 with the controller 60 regulating operation of the engine 12 and the exhaust AT system 30. Following frame 72, the method proceeds to frame 74, where the method includes treating, via the first AT device 32, the exhaust gas flow 26 carried by the exhaust passage 36.

After frame 74, the method advances to frame 76. In frame 76, the method includes detecting, via the first temperature sensor 52, a temperature of the exhaust gas flow 26 and generating the first sensor signal 54 indicative of the detected temperature. Following frame 76 the method proceeds to frame 78, where the method includes detecting, via the second temperature sensor 56, a temperature of the exhaust gas flow 26 and generating the second sensor signal 58 indicative of thus detected temperature. After frame 78, the method advances to frame 80. In frame 80 the method includes identifying by the controller 60 whether the detected temperature indicated by the first sensor signal 54 is outside of the predetermined temperature range 62.

Following frame 80, if the detected temperature indicated by the first sensor signal 54 is outside of the predetermined temperature range 62, the method moves on to frame 82. In frame 82 the method includes directing the exhaust gas flow 26, via the bypass valve 50 regulated by the controller 60, to the heat exchanger 40 to remove heat energy from the exhaust gas flow 26. On the other hand, if the detected temperature indicated by the second sensor signal 58 is within the predetermined temperature range 62, the method moves on to frame 84. In frame 84 the method includes directing the exhaust gas flow 26, via the bypass valve 50 regulated by the controller 60, to the gas flow bypass 42.

Following either frame 82 or 84, the method may loop back to frame 76 for detecting the temperature of exhaust gas flow 26 via the first temperature sensor 52. Accordingly, the controller 60 may be programmed to continuously monitor operation of the engine 12 and the AT system 30 to operate the bypass valve 50 according to the temperature of the exhaust gas flow 26 detected by the first and second sensors 52, 56. Furthermore, the method 70 is intended to facilitate an effective limiting of exhaust emissions in the exhaust gas flow 26 by enhancing and optimizing conversion efficiency of the substrate structures of the particular AT device 32 or 34. Moreover, such optimization of conversion efficiency of the respective AT device 32 or 34 is accomplished by maintaining the temperature of exhaust gas flow 26 entering the subject AT device in the predetermined temperature range 62.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An after-treatment (AT) system for a flow of exhaust gas generated by an internal combustion engine, the AT system comprising:
    an AT device;
    an exhaust passage configured to carry the exhaust gas flow from the engine to the AT device;
    a heat exchanger arranged in fluid communication with the exhaust passage upstream of the AT device and configured to remove heat energy from the exhaust gas flow;
    an exhaust gas flow bypass in fluid communication with the exhaust passage and configured to route the exhaust gas flow from the exhaust passage to the AT device around the heat exchanger;
    a bypass valve configured to selectively direct the exhaust gas flow to one of the heat exchanger and the exhaust gas flow bypass to thereby enhance conversion efficiency of the AT device in limiting exhaust emissions of the engine;
    a first temperature sensor configured to detect a temperature of the exhaust gas flow in the exhaust passage upstream of the heat exchanger and generate a first sensor signal indicative of the detected temperature;

a second temperature sensor configured to detect a temperature of the exhaust gas flow in the exhaust passage downstream of the heat exchanger and upstream of the AT device, and generate a second sensor signal indicative of the detected temperature; and an electronic controller configured to regulate the bypass valve to direct the exhaust gas flow to the heat exchanger when the detected temperature indicated by the first sensor signal is outside of a predetermined temperature range, and direct the exhaust gas flow to the exhaust gas flow bypass when the detected temperature indicated by the second sensor signal is within the predetermined temperature range.

2. The AT system of claim 1, wherein the AT device is a lean nitrogen oxide ($NO_X$) trap (LNT).

3. The AT system of claim 1, wherein the heat exchanger is an exhaust gas to liquid heat exchanger.

4. The AT system of claim 3, wherein a liquid used by the heat exchanger is a coolant of the internal combustion engine.

5. The AT system of claim 4, wherein the internal combustion engine includes a cooling circuit, and wherein the heat exchanger is in fluid communication with the cooling circuit.

6. A vehicle comprising:
an internal combustion engine configured to generate an exhaust gas flow as a byproduct of generating power; and
an exhaust system connected to the engine and having an after-treatment (AT) system for the exhaust gas flow, the AT system including:
an AT device;
an exhaust passage configured to carry the exhaust gas flow from the engine to the AT device;
a heat exchanger arranged in fluid communication with the exhaust passage upstream of the AT device and configured to remove heat energy from the exhaust gas flow;
an exhaust gas flow bypass in fluid communication with the exhaust passage and configured to route the exhaust gas flow from the exhaust passage to the AT device around the heat exchanger;
a bypass valve configured to selectively direct the exhaust gas flow to one of the heat exchanger and the exhaust gas flow bypass;
an electronic controller configured to regulate the bypass valve to thereby enhance conversion efficiency of the AT device in limiting exhaust emissions of the engine;
a first temperature sensor configured to detect a temperature of the exhaust gas flow in the exhaust passage upstream of the heat exchanger and generate a first sensor signal indicative of the detected temperature; and
a second temperature sensor configured to detect a temperature of the exhaust gas flow in the exhaust passage downstream of the heat exchanger and upstream of the AT device, and generate a second sensor signal indicative of the detected temperature;
wherein the electronic controller is configured to regulate the bypass valve to direct the exhaust gas flow to the heat exchanger when the detected temperature indicated by the first sensor signal is outside of a predetermined temperature range, and direct the exhaust gas flow to the exhaust gas flow bypass when the detected temperature indicated by the second sensor signal is within the predetermined temperature range.

7. The vehicle of claim 6, wherein the AT device is a lean nitrogen oxide ($NO_X$) trap (LNT).

8. The vehicle of claim 6, wherein the heat exchanger is an exhaust gas to liquid heat exchanger.

9. The vehicle of claim 8, wherein a liquid used by the heat exchanger is a coolant of the internal combustion engine.

10. The vehicle of claim 9, wherein the internal combustion engine includes a cooling circuit, and wherein the heat exchanger is in fluid communication with the cooling circuit.

11. A method of operating an after-treatment (AT) system having an AT device configured to treat an exhaust gas flow generated by an internal combustion engine and carried by an exhaust passage, comprising:
treating, via the AT device, the exhaust gas flow carried by the exhaust passage;
detecting, via a first temperature sensor arranged in the exhaust passage, a temperature of the exhaust gas flow and generating a first sensor signal indicative of the detected temperature;
detecting, via a second temperature sensor arranged in the exhaust passage upstream of the AT device, a temperature of the exhaust gas flow and generating a second sensor signal indicative of the detected temperature;
directing the exhaust gas flow, via a bypass valve positioned in the exhaust passage upstream of the second temperature sensor, to a heat exchanger arranged in fluid communication with the exhaust passage downstream of the first temperature sensor and upstream of the AT device and the second temperature sensor and configured to remove heat energy from the exhaust gas flow, when the detected temperature indicated by the first sensor signal is outside of a predetermined temperature range; and
directing the exhaust gas flow, via the bypass valve to a gas flow bypass in fluid communication with the exhaust passage and configured to route the exhaust gas flow from the exhaust passage to the AT device around the heat exchanger the AT device, when the detected temperature indicated by the second sensor signal is within the predetermined temperature range.

12. The method of claim 11, further comprising an electronic controller configured to regulate operation of the bypass valve, wherein directing the exhaust gas flow via the bypass valve is accomplished by the electronic controller programmed with the predetermined temperature range.

13. The method of claim 11, wherein the AT device is a lean nitrogen oxide ($NO_X$) trap (LNT).

14. The method of claim 11, wherein the heat exchanger is an exhaust gas to liquid heat exchanger.

15. The method of claim 14, wherein a liquid used by the heat exchanger is a coolant of the internal combustion engine.

16. The method of claim 15, wherein the internal combustion engine includes a cooling circuit, and wherein the heat exchanger is in fluid communication with the cooling circuit.

* * * * *